United States Patent
Hirasawa (10) Patent No.: US 12,327,536 B2
(45) Date of Patent: Jun. 10, 2025

(54) UNIVERSAL JOINT, COUPLING ROD APPRATUS, AND MUSICAL INSTRUMENT PEDAL DEVICE

(71) Applicant: HOSHINO GAKKI CO., LTD., Aichi (JP)

(72) Inventor: Satoshi Hirasawa, Nagoya (JP)

(73) Assignee: HOSHINO GAKKI CO., LTD., Nagoya (JP)

( * ) Notice: Subject to any disclaimer, the term of this patent is extended or adjusted under 35 U.S.C. 154(b) by 258 days.

(21) Appl. No.: 18/054,112

(22) Filed: Nov. 9, 2022

(65) Prior Publication Data

US 2023/0154442 A1 May 18, 2023

(30) Foreign Application Priority Data

Nov. 12, 2021 (JP) ................. 2021-185209

(51) Int. Cl.
*G10D 13/11* (2020.01)
*F16D 3/41* (2006.01)

(52) U.S. Cl.
CPC .............. *G10D 13/11* (2020.02); *F16D 3/41* (2013.01)

(58) Field of Classification Search
CPC .................................. G10D 13/11; F16D 3/41
See application file for complete search history.

(56) References Cited

U.S. PATENT DOCUMENTS

| | | | | |
|---|---|---|---|---|
| 1,143,659 A | * | 6/1915 | Stern | F16D 3/40 464/136 |
| 1,143,660 A | * | 6/1915 | Stern | F16D 3/40 464/134 |
| 2,698,527 A | * | 1/1955 | Anderson | F16D 3/41 464/130 |
| 3,070,980 A | * | 1/1963 | Slaght | F16C 17/08 464/14 |
| 3,110,166 A | * | 11/1963 | Shutt, Jr. | F16D 3/40 29/898.07 |
| 4,365,488 A | * | 12/1982 | Mochida | F16D 3/38 464/134 |
| 6,846,242 B1 | * | 1/2005 | Rivera | F16D 3/40 464/112 |
| 6,878,068 B2 | | 4/2005 | Bigelow et al. | |
| 6,976,922 B2 | * | 12/2005 | Smith | F16D 3/38 464/136 |
| 7,633,000 B2 | | 12/2009 | Dorfman et al. | |
| 7,641,560 B1 | | 1/2010 | Sikra | |

(Continued)

FOREIGN PATENT DOCUMENTS

| | | | | |
|---|---|---|---|---|
| GB | 2156482 A | * | 10/1985 | ........... B23K 11/002 |
| JP | H0673461 U | * | 1/1993 | |

OTHER PUBLICATIONS

Notice of Reasons for Refusal dated Jan. 30, 2024 issued in the Japanese Patent Application No. 2021-185209, In Japanese, not translated.

*Primary Examiner* — Robert W Horn (57) ABSTRACT

A universal joint includes two yokes respectively connected to two rotary members, a spider rotationally coupled to the two yokes, and a bearing disposed at a portion that couples the two yokes to the spider, the bearing rotationally supporting the spider. The spider is configured to be arranged in a space defined by inner surfaces of the two yokes and allow an outer ring of the bearing to be fixed to the spider.

10 Claims, 6 Drawing Sheets

(56) References Cited

U.S. PATENT DOCUMENTS

| | | | |
|---|---|---|---|
| 7,802,939 B2* | 9/2010 | Bushey | B25J 17/0275 |
| | | | 403/57 |
| 8,110,731 B1 | 2/2012 | Chen | |
| 8,556,735 B1* | 10/2013 | Dorfman | F16D 3/43 |
| | | | 84/422.1 |
| 10,968,959 B2* | 4/2021 | Kingston | F16D 3/385 |
| 11,754,125 B2* | 9/2023 | Kingston | F16D 3/40 |
| | | | 464/134 |
| 2006/0156900 A1 | 7/2006 | Dorfman et al. | |
| 2006/0156901 A1 | 7/2006 | Dorfman et al. | |
| 2014/0370994 A1* | 12/2014 | Koyama | F16D 3/41 |
| | | | 464/128 |
| 2023/0154442 A1* | 5/2023 | Hirasawa | F16D 3/387 |
| | | | 84/422.1 |

* cited by examiner

UNIVERSAL JOINT, COUPLING ROD APPRATUS, AND MUSICAL INSTRUMENT PEDAL DEVICE

1. FIELD

The present disclosure relates to a universal joint, a coupling rod apparatus, and a musical instrument pedal device.

2. DESCRIPTION OF RELATED ART

Methods for playing a bass drum by operating left and right pedal devices using two foots are known. For example, operating one pedal device using the left foot produces rotation of a rotary shaft of the other pedal device, which is located at a position separated from the first pedal device. Then, when a beater fixed to the rotary shaft of the other pedal device is rotated, the beater strikes the bass drum. The left and right pedal devices are used, with the rotary shafts of the pedal devices coupled to each other by a coupling rod. In this case, the positions of the left and right pedal devices often differ depending on the physical attribute and preference of a user. Thus, in order for the left and right pedal devices to be flexibly located, a universal joint capable of coupling the coupling rod to the rotary shafts is used with the coupling rod and the rotary shafts angled.

The universal joint includes two yokes respectively connected to two rotary members, a spider rotationally coupled to the two yokes, and bearings used to couple the two yokes to the spider. The spider is coupled to the two yokes by the bearings such that the spider is rotatable about two axes, which are orthogonal to each other. The universal joint is configured to change the coupling angle between the coupling rod and the rotary shaft and transmit rotation about the axes between the coupling rod and the rotary shaft.

For example, the following universal joints applied to a drum twin pedal or the like have been proposed. The specifications of U.S. Pat. Nos. 7,633,000, 8,556,735, and 6,878,068 each disclose a universal joint that includes two yokes, an annular spider disposed outside the two yokes, and four bearings. The specification of U.S. Pat. No. 8,110,731 or 7641560 discloses a universal joint that includes two yokes, a block-shaped spider disposed inside the two yokes, and four bearings.

The spider disclosed in U.S. Pat. No. 7,633,000 is a single component. The spider disclosed in U.S. Pat. No. 8,556,735 is formed by coupling two segments to each other. The spiders disclosed in the two documents each include four holes that radially extend through the spider and are arranged at regular intervals. The four holes of the spider each include a bearing and a shaft. The shaft is press-fitted into the inner ring of the bearing and the holes in a yoke tip. The outer ring of the bearing is fixed in the holes of the spider. The spider of U.S. Pat. No. 6,878,068 includes a spider body and four lid members coupled to the spider body. The spider disclosed in this document also includes four holes that radially extend through the spider and are arranged at regular intervals. The four holes of the spider each include a bearing and a protrusion of a yoke tip. The inner ring of the bearing is fixed to the protrusion at the yoke tip. The outer ring of the bearing is fixed in the holes of the spider.

The spider disclosed in U.S. Pat. No. 8,110,731 includes a hole which is located in each of four side surfaces that are coupled to the yoke and in which a bearing is arranged. The yoke includes threaded holes at positions corresponding to the holes in the spider. The inner ring of the bearing is fixed to the tip of a threaded pin fastened to the threaded holes in the yoke. The outer ring of the bearing is fixed in the holes of the spider. The spider disclosed in U.S. Pat. No. 7,641,560 includes a threaded hole in each of four side surfaces that are coupled to the yoke. The yoke includes threaded holes at positions corresponding to the threaded holes of the spider. The inner ring of the bearing, together with a ring-shaped spacer, is fixed to a side surface of the spider by a screw. The outer ring of the bearing is fixed to the threaded holes of the yoke.

The spiders disclosed in U.S. Pat. Nos. 7,633,000, 8,556,735, and 6,878,068 are annular bodies having a larger outer diameter than the yoke. That is, these spiders are relatively large in size and weight. Thus, a larger rotational moment force tends to be generated when a rotational force is transmitted between the two yokes. For this reason, in the twin pedal using the universal joints disclosed in U.S. Pat. Nos. 7,633,000, 8,556,735, and 6,878,068, when a bass drum is played, the feeling felt when a pedal is depressed with the left foot or when the depressed left pedal returns tends to be different from the feeling felt when a pedal is operated with the right foot. Thus, playing the bass drum using the left and right pedal devices produces a feeling of awkwardness. Accordingly, a good feeling during operation is not obtained. In addition, in the spider disclosed in U.S. Pat. No. 7,633,000 or 8556735, the positional accuracy and the dimensional accuracy are strictly required for the four bearing-fixing holes in a single component or two segments. This is because, when the bearings are simultaneously fixed in the four holes, the bearing to be disposed in the holes cannot be fixed if the diameter of one hole is relatively large or the position of one hole is shifted. The spider disclosed in U.S. Pat. No. 6,878,068 has a complicated structure due to a relatively large number of components used for the spider.

In the universal joint disclosed in U.S. Pat. No. 8,110,731, when the threaded pin is tightened, an axial load tends to be applied to the inner ring of the bearing. Thus, depending on the degree of tightening of the threaded pin, the bearing may be locked. In the universal joint disclosed in U.S. Pat. No. 7,641,560, the inner and outer rings of the bearing are intentionally twisted in order to eliminate backlash. However, this may also cause the bearing to be locked by an axial load depending on the degree of tightening of a screw or the dimensional accuracy of the components. Further, in the universal joint disclosed in U.S. Pat. No. 7,641,560, since the outer ring of the bearing is fixed to the yoke, the rotational moment force tends to be larger than in the universal joint disclosed in U.S. Pat. No. 8,110,731, in which the outer ring of the bearing is fixed to the spider.

SUMMARY

It is an objective of the present disclosure to provide a universal joint, a coupling rod apparatus, and a musical instrument pedal device that are capable of reducing a rotational moment force and reducing manufacturing burdens.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, a universal joint is provided. The universal joint includes two yokes respectively connected to two rotary members, a spider rotationally coupled to the two yokes, and a bearing disposed at a portion that couples the two yokes to the spider, the bearing rotationally supporting the spider. The spider is configured to be arranged in a space defined by inner surfaces of the two yokes and allow an outer ring of the bearing to be fixed to the spider.

According to another aspect of the present disclosure, a universal joint is provided. The universal joint includes two yokes respectively connected to two rotary members, the yokes each including an insertion hole into which a corresponding one of the rotary members is inserted, a spider rotationally coupled to the two yokes. At least one of the two yokes includes a fastener that fixes the rotary member to the insertion hole and a pushing member disposed in the insertion hole. The pushing member, when pushed by the fastener, presses the rotary member against a wall surface of the insertion hole and fixes the rotary member to the wall surface. The pushing member is configured to come into planar contact with the rotary member.

According to a further aspect of the present disclosure, a coupling rod apparatus is provided. The coupling rod apparatus is configured to couple a first device, where first rotation is produced, to a second device, where second rotation is produced, and transmit the first rotation to the second device. The coupling rod apparatus includes a universal joint connected to at least one of the first device and the second device and coupling rods coupled to the first device and the second device by the universal joint. The universal joint includes two yokes respectively connected to two rotary members, a spider rotationally coupled to the two yokes, and a bearing disposed at a portion that couples the two yokes to the spider, the bearing rotationally supporting the spider. The spider is configured to be arranged in a space defined by inner surfaces of the two yokes and allow an outer ring of the bearing to be fixed to the spider.

According to yet another aspect of the present disclosure, a musical instrument pedal device is provided. The musical instrument pedal device includes pedal devices, the musical instrument pedal device being used with rotary shafts of the pedal devices coupled to each other by a universal joint. The universal joint includes two yokes respectively connected to two rotary members, a spider rotationally coupled to the two yokes, and a bearing disposed at a portion that couples the two yokes to the spider. The bearing rotationally supporting the spider. The spider is configured to be arranged in a space defined by inner surfaces of the two yokes and allow an outer ring of the bearing to be fixed to the spider.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of universal joints 30, 40, a coupling rod apparatus 22, and a twin pedal 20 according to the present disclosure will now be described with reference to FIGS. 1 to 10. The twin pedal 20 corresponds to a musical instrument pedal device.

Figure 1:
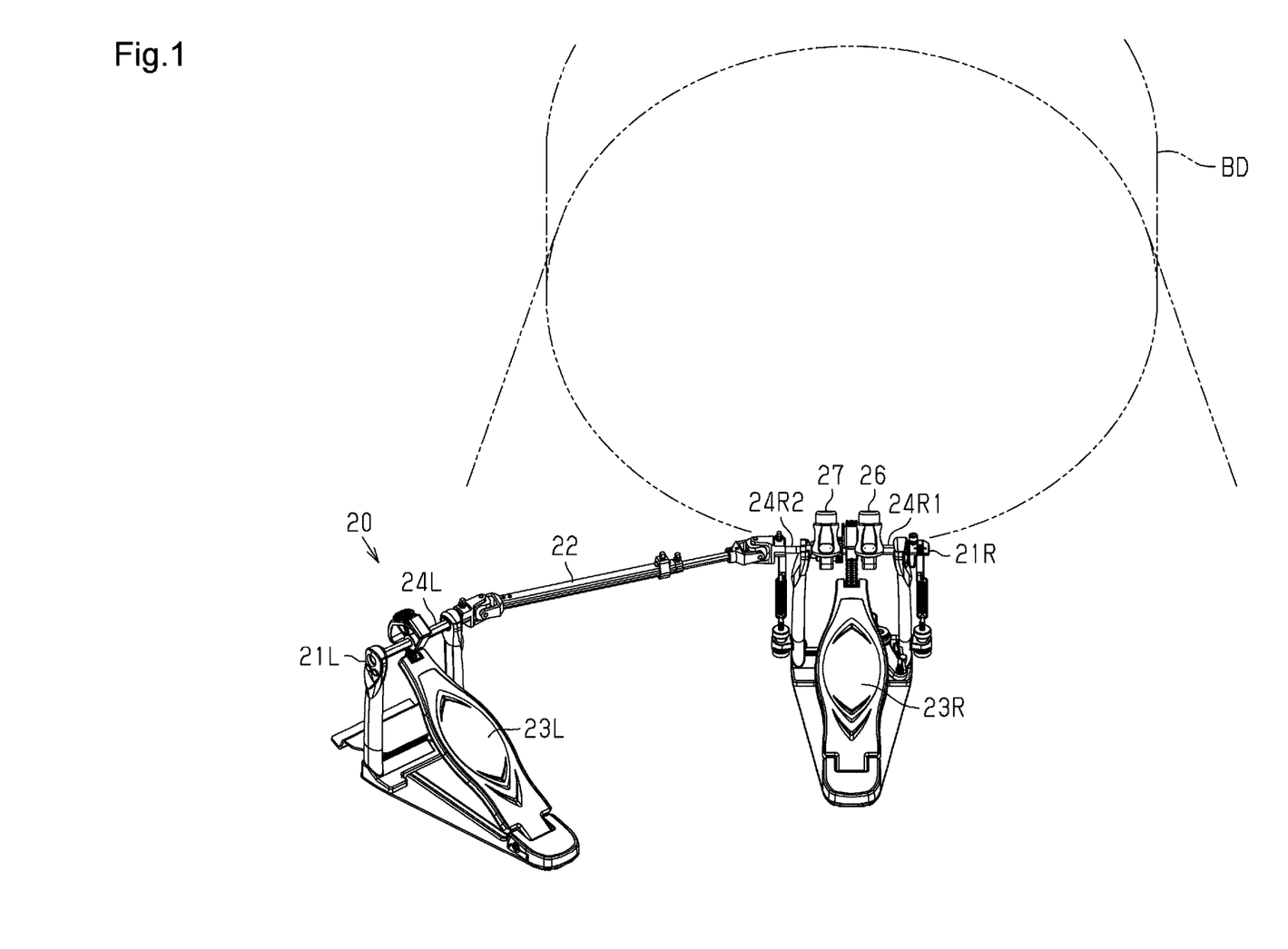
FIG. 1 is a perspective view of a twin pedal in which a musical instrument pedal device according to the present disclosure is employed.

As shown in FIG. 1, the twin pedal 20 includes two pedal devices 21L, 21R that are operated with left and right feet, respectively, and a coupling rod apparatus 22 that couples the pedal devices 21L, 21R to each other. The left pedal device 21L (first device) includes a left pedal 23L and a rotary shaft 24L (rotary member) that rotates when the left pedal 23L is depressed. The right pedal device 21R (second device) includes a right pedal 23R, a first rotary shaft 24R1 that rotates when the right pedal 23R is depressed, and a second rotary shaft 24R2 (rotary member). The second rotary shaft 24R2 is coupled to the rotary shaft 24L of the left pedal device 21L by the coupling rod apparatus 22. The twin pedal 20 is used with the rotary shaft 24L of the left pedal device 21L coupled to the second rotary shaft 24R of the right pedal device 21R.

Beaters 26, 27 that strike a bass drum BD are attached to the first and second rotary shafts 24R1, 24R2, respectively. In the twin pedal 20, when the right pedal 23R is operated with the right foot, the beater 26 rotates together with the first rotary shaft 24R1 of the right pedal device 21R and the bass drum BD is struck by the beater 26. When the left pedal 23L is operated with the left foot, the rotary shaft 24L of the left pedal device 21L rotates. The rotation is transmitted to the second rotary shaft 24R2 of the right pedal device 21R through the coupling rod apparatus 22. When the second rotary shaft 24R2 is rotated, the beater 27 rotates together with the second rotary shaft 24R2 and the bass drum BD is struck by the beater 27. That is, the coupling rod apparatus 22 is used to transmit, to the second rotary shaft 24R2 of the right pedal device 21R, the rotation of the rotary shaft 24L produced by the depression of the left pedal 23L.

Figure 2:
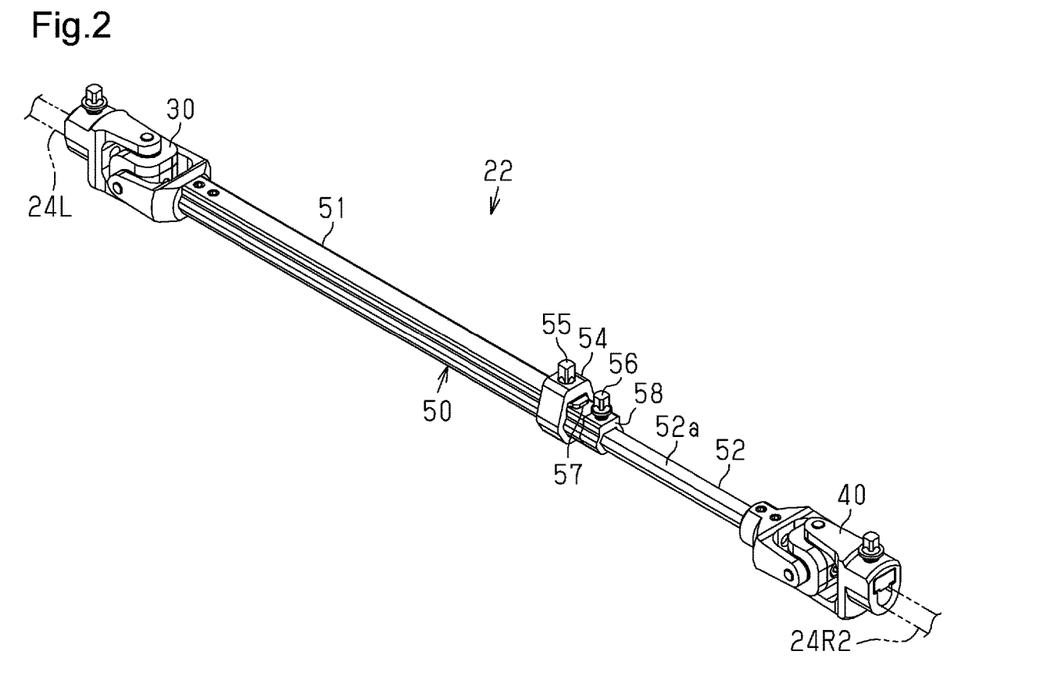
FIG. 2 is a perspective view of the coupling rod that is disposed on the twin pedal of FIG. 1, the coupling rod including universal joints according to the present disclosure.

As shown in FIGS. 1 and 2, the coupling rod apparatus 22 includes the left universal joint 30 and the right universal joint 40. The left universal joint 30 is connected to the rotary shaft 24L of the left pedal device 21L. The right universal joint 40 is connected to the second rotary shaft 24R2 of the right pedal device 21R. In addition, the coupling rod apparatus 22 includes a rod assembly 50 (rotary member) that couples the left and right universal joints 30, 40 to each other. The rod assembly 50 is formed by connecting multiple coupling rods to each other. Further, the length of the entire rod assembly 50 is configured to be adjusted.

The rod assembly 50 includes a first coupling rod 51 (rotary member) coupled to the left universal joint 30 and a second coupling rod 52 (rotary member) coupled to the right universal joint 40. The second coupling rod 52 has a hexagonal cross-section including an upper surface 52a that is wider than the other surfaces. The first coupling rod 51 is tubular and is capable of accommodating the second coupling rod 52. The second coupling rod 52 is disposed in the first coupling rod 51 in a slidable manner in the axial direction of the first coupling rod 51.

The rod assembly 50 also includes an adjuster 54 used to adjust the length of the entire rod assembly 50. The adjuster 54 has a bolt 55 used to fix the second coupling rod 52 into the first coupling rod 51. The adjuster 54 is configured to press a pressing plate 57 against the upper surface 52a of the second coupling rod 52 by tightening the bolt 55. That is, by operating the bolt 55, the position of the second coupling rod 52 relative to the first coupling rod 51 is changed to adjust the length of the entire rod assembly 50 and the adjusted length is fixed.

The rod assembly 50 also includes a memory lock 58 that stores the length of the entire rod assembly 50. For example, a state used for transportation, in which the second coupling rod 52 is pulled out of the first coupling rod 51, may be changed to a use state, in which the second coupling rod 52 is inserted into the first coupling rod 51. In this case, attaching the memory lock 58 to the second coupling rod 52 allows the rod assembly 50 to be easily restored to its original length prior to transportation.

The memory lock 58 has a tubular shape with a flat upper surface and is attached to the second coupling rod 52. A bolt 56 is fastened to the upper surface of the memory lock 58. The memory lock 58 is configured to directly press the tip of the bolt 56 against the upper surface 52a when the bolt 56 is tightened. That is, by operating the bolt 56, the position of the memory lock 58 relative to the second coupling rod 52 is changed or the position of the memory lock 58 is fixed.

The structures of the universal joints 30, 40 will now be described with reference to FIGS. 3 to 8. The same parts of the right universal joint 40 in the left universal joint 30 will not be described in detail.

Figure 3:
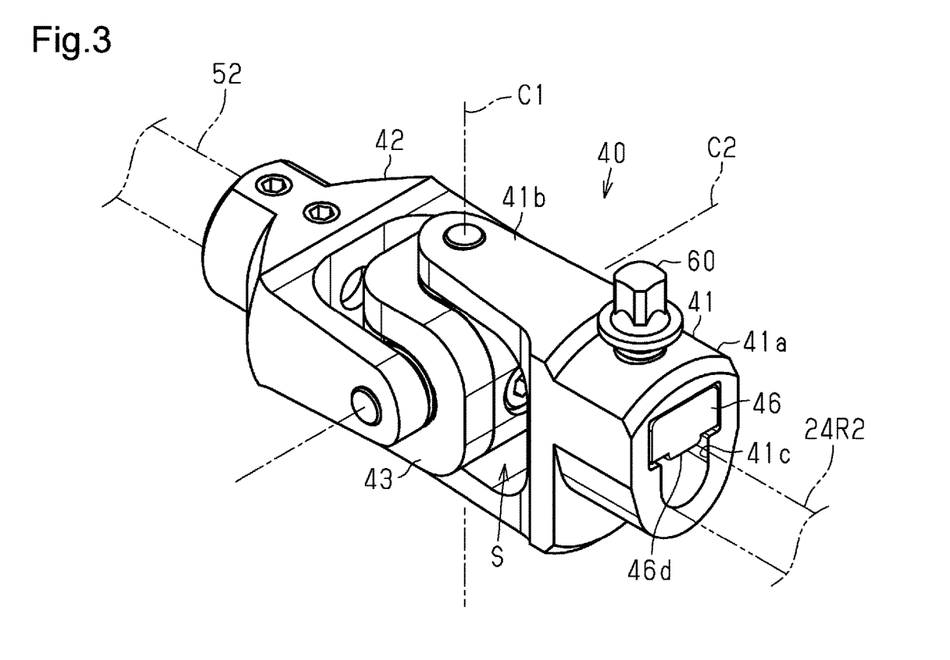
FIG. 3 is a perspective view of a universal joint of FIG. 1.
Figure 4:
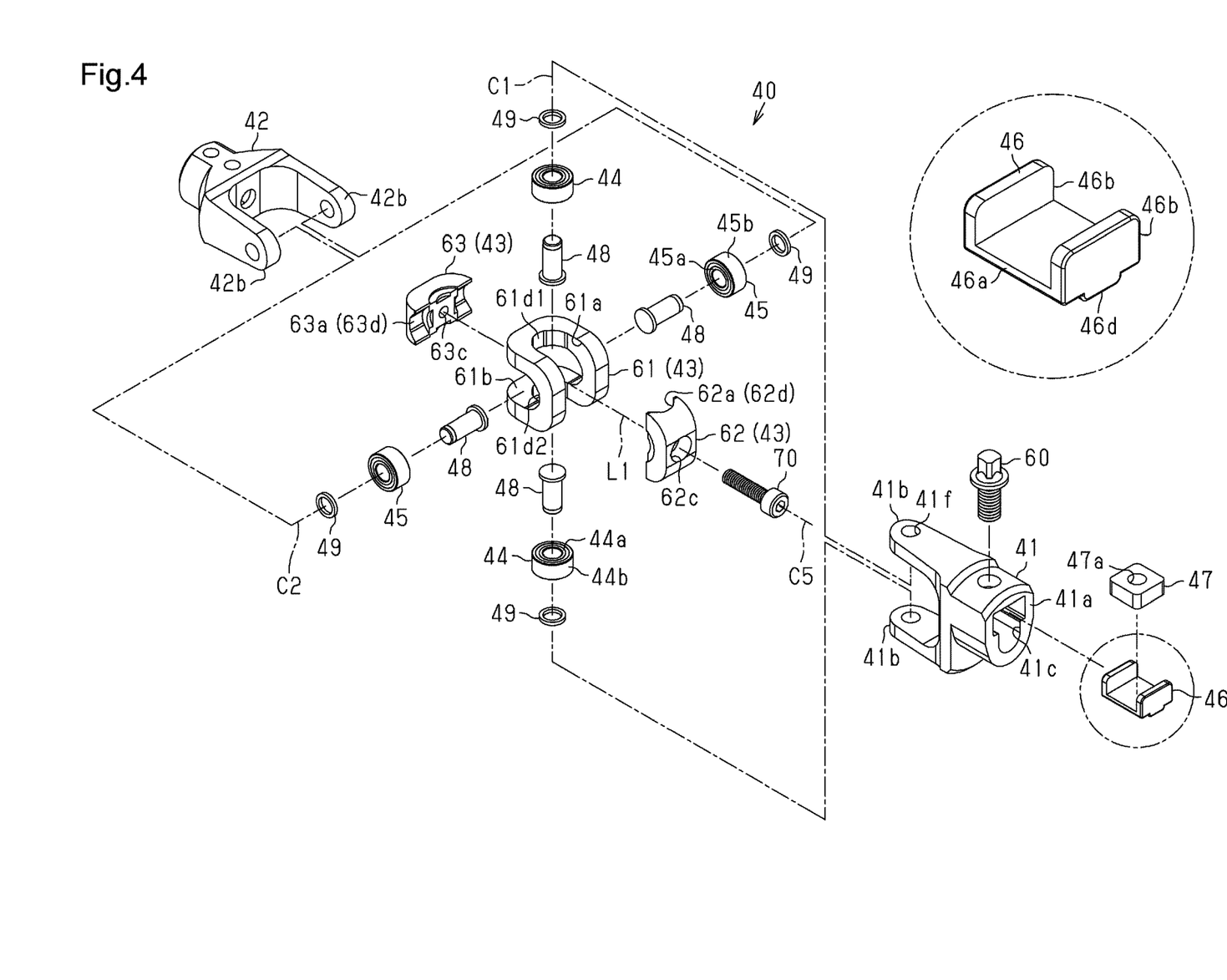
FIG. 4 is an exploded perspective view of the universal joint of FIG. 1.

As shown in FIGS. 3 and 4, the universal joint 40 includes a first yoke 41 connected to the second rotary shaft 24R2 of the right pedal device 21R and a second yoke 42 connected to the second coupling rod 52 of the rod assembly 50. The first yoke 41 rotates together with the second rotary shaft 24R2. The second yoke 42 rotates together with the second coupling rod 52. The universal joint 40 further includes a spider 43 rotationally coupled to the first and second yokes 41, 42 and four bearings used to couple the first and second yokes 41, 42 to the spider 43. The four bearings include two first bearings 44 disposed at a portion that couples the first yoke 41 to the spider 43 and two second bearings 45 disposed at a portion that couples the second yoke 42 to the spider 43. The two first bearings 44 share an axis C1 and rotationally support the spider 43 at two positions on the axis C1. Likewise, the two second bearings 45 share an axis C2 and rotationally support the spider 43 at two positions on the axis C2.

The spider 43 is coupled to the first and second yokes 41, 42 by the four bearings such that the spider 43 is rotatable about the two axes C1, C2, which are orthogonal to each other. Since the spider 43 is coupled to the first and second yokes 41, 42 in this manner, the universal joint 40 is configured to change the coupling angle between the second coupling rod 52 and the second rotary shaft 24R2. In addition, the universal joint 40 is configured to transmit rotation about the axes between the second coupling rod 52 and the second rotary shaft 24R2.

The structures of the first and second yokes 41, 42 will now be described in detail. The same parts of the first yoke 41 in the second yoke 42 will not be described in detail.

Figure 5:
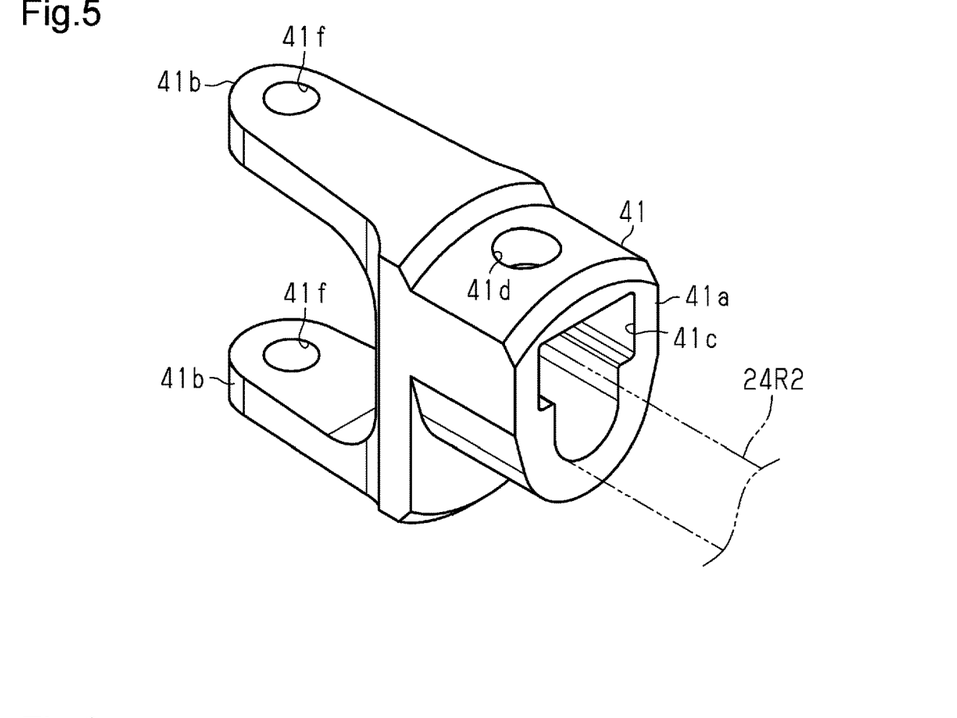
FIG. 5 is a perspective view of the first yoke included in the universal joint of FIG. 1.
Figure 6:
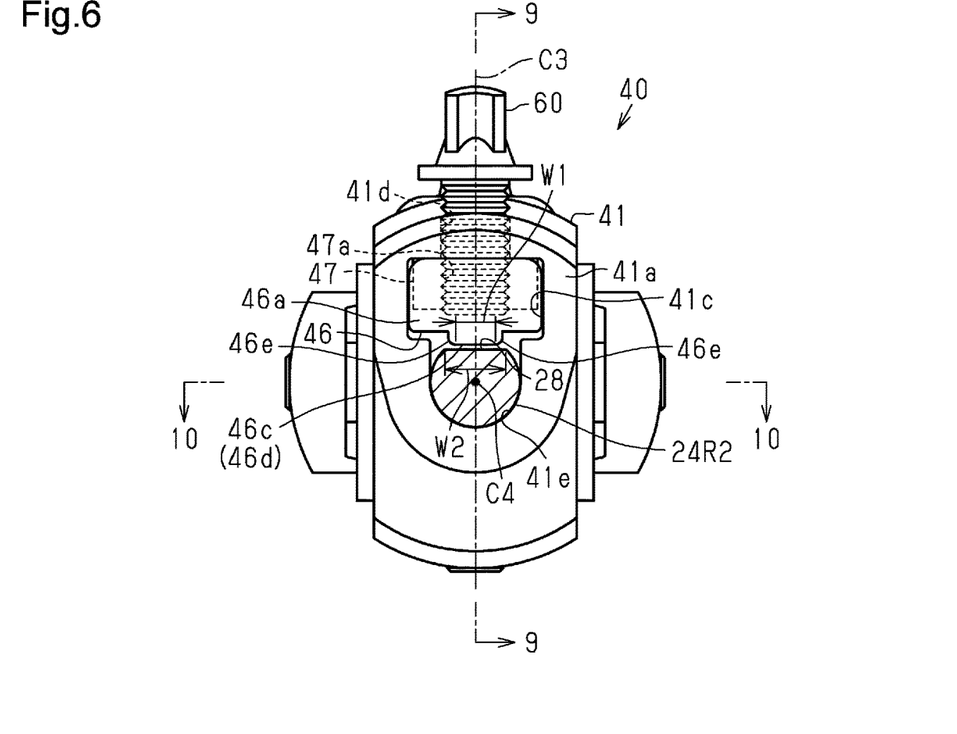
FIG. 6 is a front view of the universal joint of FIG. 1, as viewed in the axial direction of the rotary shaft.

As shown in FIGS. 4 to 6, the first yoke 41 includes a tubular yoke body 41a to which the second rotary shaft 24R2 is connected, and two (upper and lower) arms 41b to which the first bearings 44 are respectively attached. The yoke body 41a includes an insertion hole 41c having a substantially T-shaped cross-section. The upper half of the insertion hole 41c has a rectangular cross-section. The lower half of the insertion hole 41c has a substantially semi-circular cross section.

A pushing member 46 having a substantially U-shaped cross-section and a flat positioning member 47 having a flat square column are accommodated in the upper part of the insertion hole 41c. The pushing member 46 includes a bottom wall 46a and two side walls 46b extending upward from the opposite side edges of the bottom wall 46a, respectively. A pushing portion 46d having a flat surface 46c protrudes from the outer surface of the bottom wall 46a. The pushing member 46 is disposed in the insertion hole 41c, with the pushing portion 46d facing downward.

The positioning member 47 is disposed in a space between the opposite side walls 46b of the pushing member 46. A threaded hole 47a is formed at the center of the positioning member 47. An insertion hole 41d through which a bolt 60 (fastener) is inserted is formed at the center of the upper portion of the yoke body 41a. The bolt 60 is inserted through the insertion hole 41d and fastened to the threaded hole 47a of the positioning member 47. In this state, the tip of the bolt 60 is in contact with the inner surface of the bottom wall 46a of the pushing member 46.

The second rotary shaft 24R2 has a substantially circular cross-section with a flat upper surface 28. The upper surface 28 of the second rotary shaft 24R2 is shaped in correspondence with the pushing portion 46d of the pushing member 46 accommodated in the insertion hole 41c of the yoke body 41a. Thus, when the bolt 60 is fastened so that the bottom wall 46a of the pushing member 46 is pushed by the tip of the bolt 60, the upper surface 28 of the second rotary shaft 24R2 is pushed by the pushing portion 46d of the pushing member 46. This causes the second rotary shaft 24R2 to be pressed against the wall surface 41e of the insertion hole 41c and thus fitted to the yoke body 41a of the first yoke 41.

In this case, the pushing member 46 is pushed from above against the second rotary shaft 24R2, with the flat surface 46c in planar contact with the upper surface 28. That is, the flat surface 46c of the pushing member 46 is a contact surface that comes into planar contact with the second rotary shaft 24R2 and has a first width W1. The pushing member 46 includes rounded corners 46e respectively located at the opposite ends of the flat surface 46c in the width direction. The upper surface 28 of the second rotary shaft 24R2 is a contact surface that comes into planar contact with the pushing member 46 and has a second width W2. The second width W2 is greater than the first width W1. The first and second widths W1, W2 are dimensions in a direction orthogonal to an axis C3 of the bolt 60 and an axis C4 of the second rotary shaft 24R2 when the pushing member 46 is in planar contact with the second rotary shaft 24R2.

As shown in FIGS. 4, 5, 9, and 10, the arms 41b extend from the upper and lower portions of the first yoke 41, respectively, toward the side opposite the opening of the insertion hole 41c of the yoke body 41a. A fixing hole 41f is formed in the vicinity of the tip of each arm 41b. Each fixing hole 41f is used to fix the corresponding first bearing 44 together with a ring-shaped collar 49. Press-fitting the tips of fixing pins 48 respectively into the fixing holes 41f causes an inner ring 44a of each first bearing 44 and the corresponding collar 49 to be fixed between the head of the fixing pin 48 and the arm 41b. In this state, the fixing pin 48 fixes the inner ring 44a of the first bearing 44 to the inner surface of the arm 41b in the axial direction of the first bearing 44. In the second yoke 42, the same method is employed to cause an inner ring 45a of each second bearing 45 and the corresponding collar 49 to be fixed between the head of a fixing pin 48 and an arm 42b. In the present embodiment, the first bearings 44 and the second bearings 45 are ball bearings in which balls 44c, 45c are disposed between inner rings 44a, 45a and outer rings 44b, 45b, respectively.

The structure of the spider 43 will now be described in detail.

As shown in FIGS. 3 and 4, the spider 43 includes multiple components and has a substantially hexahedral shape. The spider 43 is divided into a spider body 61 and a first lid 62 by first dividing surfaces 61a, 62a, and is divided into the spider body 61 and a second lid 63 by second dividing surfaces 61b, 63a. The spider 43 is configured to allow the outer rings 44b, 45b of the four bearings 44, 45 to be fixed to the spider 43 by coupling the spider body 61 to the first and second lids 62, 63. To couple the spider body 61 to the first and second lids 62, 63, a bolt 70 (fixing member) is used. In addition, the spider 43 is sized such that the spider 43 can be disposed in a space S defined by the inner surfaces of the first and second yokes 41, 42.

Figure 9:
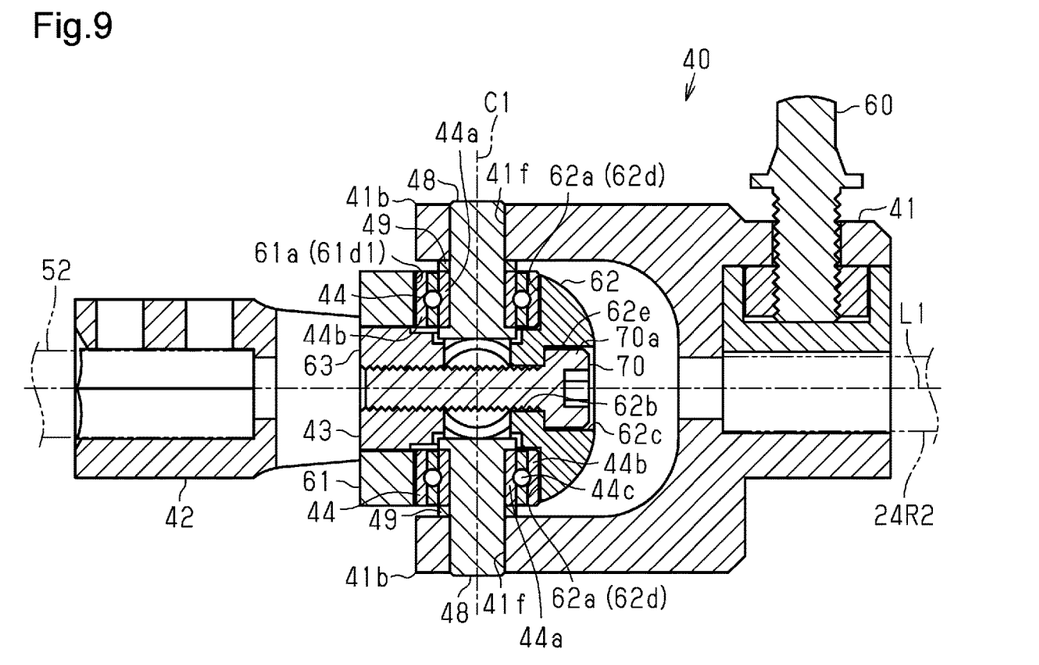
FIG. 9 is a cross-sectional view taken along line 9-9 in FIG. 6.
Figure 10:
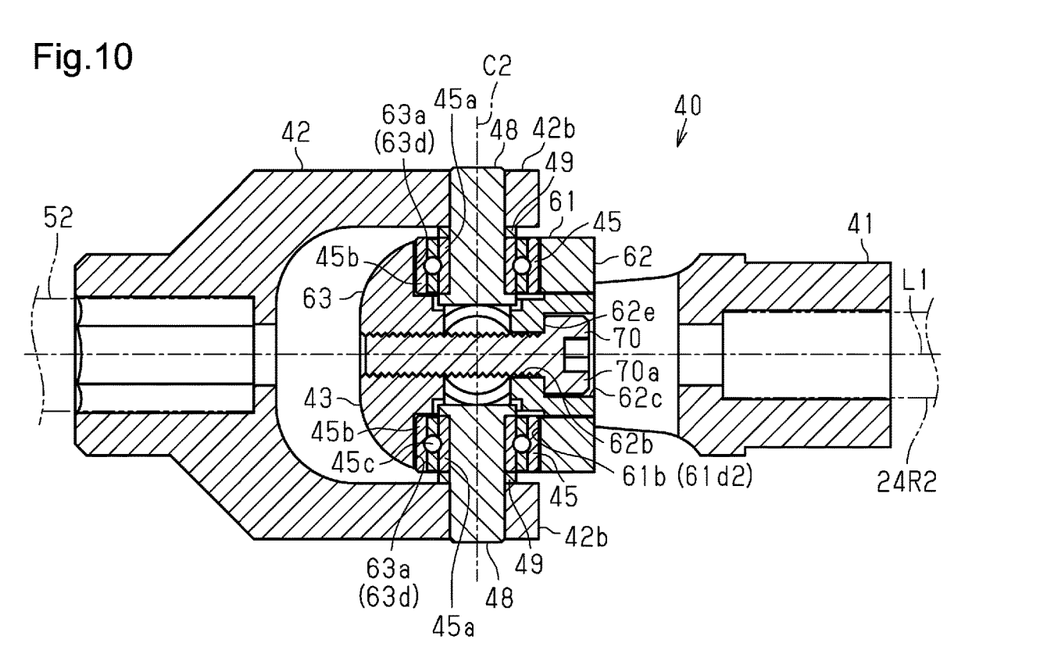
FIG. 10 is a cross-sectional view taken along line 10-10 in FIG. 6.

As shown in FIGS. 4, 9, and 10, the spider body 61 is shaped such that the portions to which the first and second lids 62, 63 and the four bearings 44, 45 are coupled are removed from the spider 43, which is substantially hexahedral. Thus, the spider body 61 is U-shaped in a side view and ring-shaped in a front view with reference to the direction in which the first and second lids 62, 63 are coupled to the spider body 61.

The first dividing surface 61a of the spider body 61 includes a first accommodation portion 61d1 (recess) in which the outer rings 44b of the two first bearings 44 are arranged. In the spider 43, the first accommodation portion 61d1 is shaped in correspondence with the first lid 62 and the first bearings 44. The two inner end surfaces of the first accommodation portion 61d1 have an arcuate shape so as to partially coincide with the outer circumferential surfaces of the outer rings 44b of the first bearings 44.

The second dividing surface 61b of the spider body 61 includes a second accommodation portion 61d2 (recess) in which the outer rings 45b of the two second bearings 45 are arranged. In the spider 43, the second accommodation portion 61d2 is shaped in correspondence with the second lid 63 and the second bearings 45. The two inner end surfaces of the second accommodation portion 61d2 have an arcuate shape so as to partially coincide with the outer circumferential surfaces of the outer rings 45b of the second bearings 45.

A first insertion hole 62b through which the bolt 70 is inserted and a second insertion hole 62c having a larger diameter than the first insertion hole 62b are formed at the center of the first lid 62. The second insertion hole 62c connects to the first insertion hole 62b. The first dividing surface 62a of the first lid 62 includes a recessed first contact portion 62d with which the outer rings 44b of the two first bearings 44 are brought into contact. The first contact portion 62d has an arcuate shape so as to partially coincide with the outer circumferential surfaces of the outer rings 44b of the first bearings 44.

A threaded hole 63c to which the tip of the bolt 70 is fastened is formed at the center of the second lid 63. The second dividing surface 63a of the second lid 63 includes a recessed second contact portion 63d with which the outer rings 45b of the two second bearings 45 are brought into contact. The second contact portion 63d has an arcuate shape so as to partially coincide with the outer circumferential surfaces of the outer rings 45b of the second bearings 45. The second lid 63 is the same as the first lid 62 except that the second lid 63 has the threaded hole 63c instead of the first and second insertion holes 62b, 62c.

The spider body 61, the first lid 62, and the second lid 63 are coupled to each other in a state of being arranged on a straight line L1 that is orthogonal to the axis C1 of the first bearing 44 and the axis C2 of the second bearing 45. The first and second lids 62, 63 are coupled to the spider body 61 at positions facing the spider body 61. The second lid 63 is coupled to the spider body 61 in an orientation different from that of the first lid 62 by 90 degrees. The spider body 61, the first lid 62, and the second lid 63 are coupled to each other by the bolt 70 in the direction orthogonal to the axes C1, C2. The bolt 70 is arranged such that an axis C5 of the bolt 70 coincides with the straight line L1, with the first and second lids 62, 63 fixed to the spider body 61.

The operation of the universal joints 30, 40 will now be described. First, the operation in the method for coupling the universal joints 30, 40 will be described with reference to FIGS. 4, 9, and 10.

As shown in FIGS. 4, 9, and 10, the fixing pins 48 are used to fix the inner rings 44a of the first bearings 44 to the inner surface of the first yoke 41 in the axial direction of the first bearings 44 and attach the first bearings 44 to the inner surface of the first yoke 41. Likewise, the fixing pins 48 are used to fix the inner rings 45a of the second bearings 45 to the inner surface of the second yoke 42 in the axial direction of the second bearings 45 and attach the second bearings 45 to the inner surface of the second yoke 42.

Next, the first yoke 41 to which the first bearings 44 are attached and the second yoke 42 to which the second bearings 45 are attached are coupled to the spider body 61. The first bearings 44 of the first yoke 41 are first fitted into the first accommodation portion 61d1 of the spider body 61. Then, the first lid 62 is fitted into the first accommodation portion 61d1 so as to cover the two first bearings 44 arranged in the first accommodation portion 61d1. Likewise, the second bearings 45 of the second yoke 42 are fitted into the second accommodation portion 61d2 of the spider body 61. Then, the second lid 63 is fitted into the second accommodation portion 61d2 so as to cover the two second bearings 45 arranged in the second accommodation portion 61d2.

Subsequently, the bolt 70 is used to fix the first and second lids 62, 63 to the spider body 61. The bolt 70 is fastened to the threaded hole 63c of the second lid 63 until a head 70a is brought into contact with a step 62e at the boundary between the first insertion hole 62b and the second insertion hole 62c. Tightening the bolt 70 fixes the first and second lids 62, 63 to the spider body 61. This causes the outer rings 44b of the first bearings 44 to be held by the first lid 62 and the spider body 61. As a result, the outer rings 44b of the two first bearings 44 are fixed on the first dividing surface 61a of the spider body 61 and the first dividing surface 62a of the first lid 62. Likewise, the outer rings 45b of the second bearings 45 are held by the second lid 63 and the spider body 61. As a result, the outer rings 45b of the two second bearings 45 are fixed on the second dividing surface 61b of the spider body 61 and the second dividing surface 63a of the second lid 63. In this manner, the outer rings 44b, 45b of the first and second bearings 44, 45 are fixed to the spider 43, and the spider 43 is coupled to the first and second yokes 41, 42 by the first and second bearings 44, 45.

In this case, the direction in which the bolt 70 is tightened is orthogonal to the direction in which the fixing pins 48 are press-fitted (i.e., the axes C1, C2 of the first and second bearings 44, 45). The load produced when the first and second lids 62, 63 are coupled to the spider body 61 using the bolt 70 acts in the direction orthogonal to the axes C1, C2 of the first and second bearings 44, 45. Thus, at the portion that couples the first and second yokes 41, 42 to the spider 43, the load produced by tightening the bolt 70 is less likely to act in the same direction as the axes C1, C2 of the first and second bearings 44, 45. Accordingly, during coupling of the universal joints 30, 40, the inner rings 44a and 45a and the outer rings 44b and 45b of the first and second bearings 44, 45 are less likely to be twisted by the tightening of the bolt 70.

In addition, the spider 43 of each of the universal joints 30, 40 is sized such that the spider 43 can be disposed in the space S, which is defined by the inner surfaces of the first and second yokes 41, 42. That is, the spider 43 is sized such that the spider 43 can be disposed in a space having a smaller size than the first and second yokes 41, 42. Thus, the universal joint 30, 40 have a reduced rotational moment force generated when a rotational force is transmitted between the first and second yokes 41, 42. Accordingly, in the twin pedal 20 using the universal joints 30, 40, the following advantage is achieved when the bass drum BD is played. The feeling felt when the left pedal 23L is depressed with the left foot or when the depressed left pedal 23L returns is less likely to be different from the feeling felt when the right pedal 23R is operated with the right foot. This eliminates a feeling of awkwardness when the bass drum BD is played using the left and right pedal devices 21L, 21R. As a result, a good feeling during operation is obtained.

Figure 7:
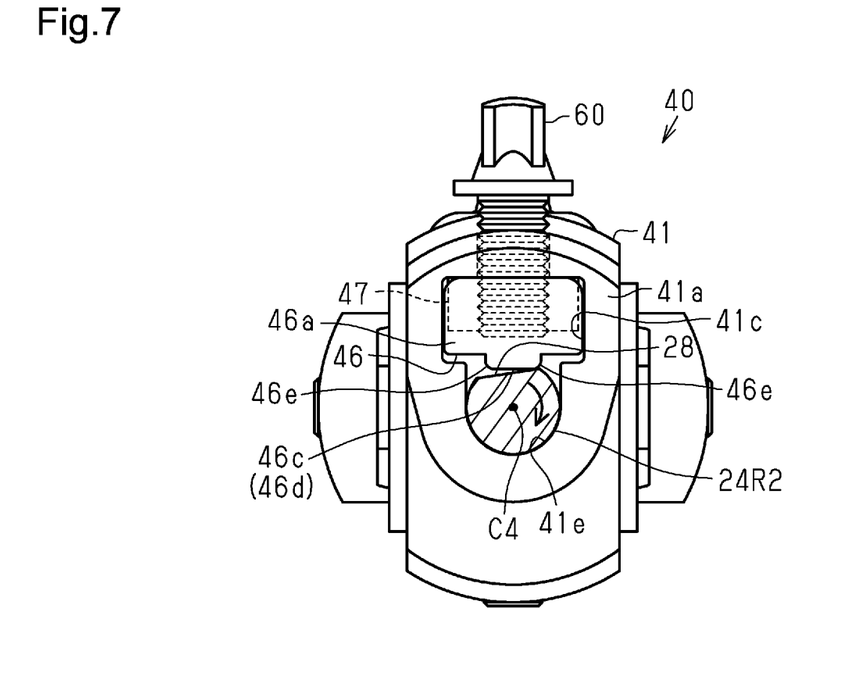
FIG. 7 is a front view showing the universal joint of FIG. 1, with the rotary shaft tilted about the axis.
Figure 8:
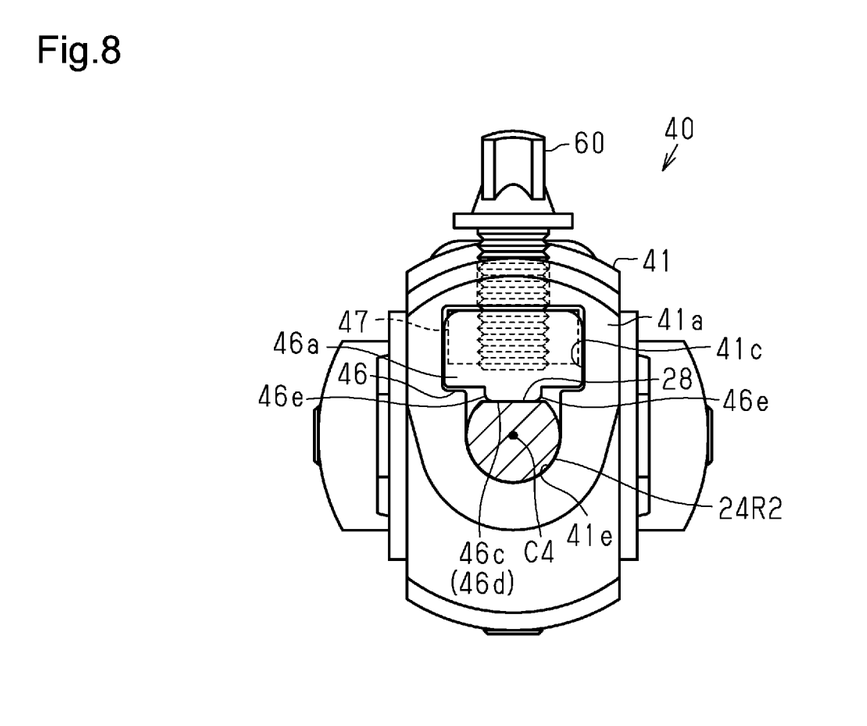
FIG. 8 is a front view showing the universal joint of FIG. 1, with the tilt of the rotary shaft about the axis corrected when pushed by the pushing member.

The operation produced when the second rotary shaft 24R2 of the pedal device 21R is connected to the universal joint 40 will now be described with reference to FIGS. 6, 7, and 8.

FIG. 6 shows a state in which the second rotary shaft 24R2 is not tilted about the axis (C4) before the bolt 60 is tightened. In this state, the flat surface 46c of the pushing member 46 and the upper surface 28 of the second rotary shaft 24R2 are substantially parallel to each other. This allows the flat surface 46c of the pushing member 46 to easily come into planar contact with the upper surface 28 of the second rotary shaft 24R2 by tightening the bolt 60. As shown in FIG. 8, when the pushing member 46 is pushed from above against the second rotary shaft 24R2, the second rotary shaft 24R2 is pressed against the wall surface 4l of the insertion hole 41c. FIG. 7 shows a state in which the second rotary shaft 24R2 is tilted about the axis (C4) before the bolt 60 is tightened. In this state, the flat surface 46c of the pushing member 46 and the upper surface 28 of the second rotary shaft 24R2 are not parallel to each other.

In the present embodiment, the second width W2 of the upper surface 28 of the second rotary shaft 24R2 is greater than the first width W1 of the flat surface 46c of the pushing member 46. Further, the rounded corners 46e are respectively disposed at the opposite ends of the flat surface 46c in the width direction. Thus, when the bolt 60 is tightened from the state shown in FIG. 7, the upper surface 28 of the second rotary shaft 24R2 is pushed by one of the corner portions 46e of the flat surface 46c. This causes the second rotary shaft 24R2 to rotate about the axis (C4) in the direction represented by the arrow in FIG. 7 until the flat surface 46c of the pushing member 46 comes into planar contact with the upper surface 28 of the second rotary shaft 24R2. As a result, even when the flat surface 46c of the pushing member 46 is not parallel to the upper surface 28 of the second rotary shaft 24R2, the pushing member 46 and the second rotary shaft 24R2 are smoothly brought into planar contact with each other as shown in FIG. 8. That is, even in a state where the second rotary shaft 24R2 is tilted about the axis (C4), the tilt of the second rotary shaft 24R2 about the axis (C4) is corrected when the second rotary shaft 24R2 is pushed by the pushing member 46.

Accordingly, the present embodiment provides the following advantages.

(1) The spider 43 is sized such that the spider 43 can be disposed in the space S, which is defined by the inner surfaces of the first and second yokes 41, 42. That is, the spider 43 is sized such that the spider 43 can be disposed in a space having a smaller size than the first and second yokes 41, 42. Thus, the universal joints 30, 40 have a reduced rotational moment force generated when a rotational force is transmitted between the first and second yokes 41, 42.

(2) The outer rings 44b, 45b of the first and second bearings 44, 45 are fixed to the spider 43 by coupling multiple components to each other in the direction orthogonal to the axes C1, C2 of the first and second bearings 44, 45. The load produced by coupling the components acts in the direction orthogonal to the axes C1, C2 of the first and second bearings 44, 45. Thus, at the portion that couples the first and second yokes 41, 42 to the spider 43, the load is less likely to act in the same direction as the axes C1, C2 of the first and second bearings 44, 45. This facilitates coupling of the universal joints 30, 40 without locking the first and second bearings 44, 45. As a result, manufacturing burdens are reduced.

(3) The first dividing surface 61a of the spider body 61 includes the recessed first accommodation portion 61d1, in which the outer rings 44b of the first bearings 44 are arranged. Further, the second dividing surface 61b of the spider body 61 includes the recessed second accommodation portion 61d2, in which the outer rings 45b of the second bearings 45 are arranged. This structure allows for coupling of the universal joints 30, 40 with the first and second bearings 44, 45 arranged in the spider 43. As a result, the universal joints 30, 40 have a compact shape in the vicinity of the portion that couples the first and second yokes 41, 42 to the spider 43. This further reduces the rotational moment force.

(4) The spider 43 is formed by coupling the spider body 61 to the first and second lids 62, 63. In this structure, first, the first and second bearings 44, 45 are respectively arranged in the first and second accommodation portions 61d1, 61d2 of the spider body 61. Then, the first and second lids 62, 63 are coupled to the spider body 61 so as to cover the first and second bearings 44, 45 in the first and second accommodation portions 61d1, 61d2. This allows the outer rings 44b, 45b of the first and second bearings 44, 45 to be fixed to the spider 43 at the same time when the spider 43 is manufactured by coupling multiple components. Accordingly, the efficiency of coupling the universal joints 30, 40 is improved. As a result, manufacturing burdens are further reduced.

(5) The two first bearings 44, which share the axis C1, are fixed at two positions on the axis C1 by the first dividing surfaces 61a, 62a of the spider 43. Further, the two second bearings 45, which share the axis C2, are fixed at two positions on the axis C2 by the second dividing surfaces 61b, 63a of the spider 43. In this structure, the number of bearings 44 that need to be positioned relative to the spider 43 is reduced by half as compared with a conventional structure in which a component of the spider 43 has four holes used to fix bearings. Accordingly, even if the dimensional accuracy of the components is lower than that of the conventional spider, the outer rings 44b of the bearings 44 are easily pressed against and fixed to the spider 43. This further reduces manufacturing burdens.

(6) The first lid 62 is fitted into the first accommodation portion 61d1 so as to cover the two first bearings 44 arranged in the first accommodation portion 61d1. Likewise, the second lid 63 is fitted into the second accommodation portion 61d2 so as to cover the two second bearings 45 arranged in the second accommodation portion 61d2. In this structure, the first lid 62, which is used to fix the two first bearings 44 to the spider 43, is a single component. Likewise, the second lid 63, which is used to fix the two second bearings 45 to the spider 43, is a single component. Thus, as compared with when each of two bearings is fixed using a different lid, the number of components is reduced and the structures of the universal joints 30, 40 are simplified. This further improves the efficiency of coupling the universal joints 30, 40.

(7) The spider body 61, the first lid 62, and the second lid 63 are coupled to each other in a state of being arranged on the straight line L1, which is orthogonal to the axis C1 of the first bearings 44 and the axis C2 of the second bearings 45. This structure allows the center of gravity of the spider 43 to be set in the vicinity of the center of the space S, which is defined by the inner surfaces of the first and second yokes 41, 42. Accordingly, since the center of gravity is set in the vicinity of the center of the universal joints 30, 40, the rotational moment force in the universal joints 30, 40 is further reduced.

(8) The first and second lids 62, 63 are coupled to the spider body 61 at positions facing the spider body 61. This easily makes the center of gravity of the spider 43 closer to the center of the space S, which is defined by the inner surfaces of the first and second yokes 41, 42.

(9) The bolt 70 is arranged such that the axis C5 of the bolt 70 coincides with the straight line L1, with the first and second lids 62, 63 fixed to the spider body 61. In this structure, the arrangement of the bolt 70, the spider body 61, and the lids 62, 63 on the same straight line makes the center of gravity of the spider 43 closer to the center of the space S, which is defined by the inner surfaces of the first and second yokes 41, 42. Accordingly, since the center of gravity is made closer to the center of the universal joints 30, 40, the rotational moment force in the universal joints 30, 40 is further reduced.

(10) The fixing pins 48 are used to fix the inner rings 44a of the first bearings 44 to the inner surface of the first yoke 41 in the axial direction of the first bearings 44. Likewise, the fixing pins 48 are used to fix the inner rings 45a of the second bearings 45 to the inner surface of the second yoke 42 in the axial direction of the second bearings 45. In this structure, the direction in which the inner rings 44a, 45a of the first and second bearings 44, 45 are fixed to the inner surfaces of the first and second yokes 41, 42 is orthogonal to the direction in which the outer rings 44b, 45b of the first and second bearings 44, 45 are fixed to the spider 43. That is, during coupling of the universal joints 30, 40, load is less likely to act in the same direction on the inner rings 44a, 45a and the outer rings 44b, 45b of the first and second bearings 44, 45. This facilitates coupling of the universal joints 30, 40 without twisting the inner rings 44a, 45a and the outer rings 44b, 45b of the first and second bearings 44, 45. As a result, manufacturing burdens are further reduced.

(11) A method may be employed to fix a rotary member to the wall surface of an insertion hole of a yoke by directly pressing the tip of a fastener (e.g., screw or bolt) against the rotary member. In the present disclosure, the pushing member 46 is pushed from above against the second rotary shaft 24R2 by the bolt 60, with the flat surface 46c in planar contact with the upper surface 28. In this case, an axial force produced by the bolt 60 is transmitted to the second rotary shaft 24R2, in a state where the pushing member 46 pushed by the bolt 60 is in planar contact with the second rotary shaft 24R2. This allows the second rotary shaft 24R2 to be pressed against and fixed to the wall surface 41e of the insertion hole 41c. In this case, as compared with the conventional fixing method, an axial force produced by the fastener is transmitted to a wider area of the rotary member. This ensures that the second rotary shaft 24R2 is fixed to the insertion hole 41c of the first yoke 41.

(12) The upper surface 28 of the second rotary shaft 24R2 is a contact surface that comes into planar contact with the pushing member 46 and has a second width W2, which is greater than the first width W1 of the flat surface 46c. In this structure, when an axial force produced by the bolt 60 causes the pushing member 46 to be pushed against the second rotary shaft 24R2, the corners 46e at the opposite ends of the flat surface 46c in the width direction push the upper surface 28 of the second rotary shaft 24R2. Thus, even when the second rotary shaft 24R2 is tilted about the axis C4, the pushing member 46 and the second rotary shaft 24R2 are smoothly brought into planar contact with each other. That is, even when the second rotary shaft 24R2 is tilted about the axis (C4), the tilt of the second rotary shaft 24R2 about the axis (C4) is corrected when the second rotary shaft 24R2 is pushed by the pushing member 46. This improves the efficiency of fixing the second rotary shaft 24R2 to the insertion hole 41c of the first yoke 41 using the bolt 60.

In addition, the pushing member 46 includes the rounded corners 46e, which are respectively located at the opposite ends of the flat surface 46c in the width direction. In this structure, the rounded shapes of the corners 46e of the pushing member 46 allow the corners 46e of the pushing member 46 to smoothly contact the second rotary shaft 24R2. That is, this structure limits situations in which the corners 46e of the pushing member 46 are caught by the upper surface 28 of the second rotary shaft 24R2. Thus, the pushing member 46 smoothly pushes the second rotary shaft 24R2. Accordingly, the pushing member 46 and the second rotary shaft 24R2 are easily brought into planar contact with each other.

The above embodiment may be modified as follows.

In the present embodiment, the spider 43 is supported by the two first bearings 44 at two positions on the axis C1 of the first bearings 44 and by the two second bearings 45 at two positions on the axis C2 of the second bearings 45. Instead, for example, two bearings respectively arranged on the two axes C1, C2, which are orthogonal to each other, may be fixed to the spider 43. That is, the universal joints 30, 40 may be coupled by fixing two bearings having no shared axis to the spider 43.

In the present embodiment, the spider 43 is substantially hexahedral. Instead, the spider 43 may have another three-dimensional (e.g., spherical or polyhedral) shape as long as the spider 43 is shaped so as to be rotatable in the space S, which is defined by the inner surfaces of the first and second yokes 41, 42.

In the present embodiment, a structure may be employed in which the first lid 62 is divided into two lid pieces and the two lid pieces are coupled to the spider body 61 so as to respectively cover the two first bearings 44 arranged in the first accommodation portion 61d1. The second lid 63 may also be divided into two lid pieces and coupled to the spider body 61 in the same manner.

In the present embodiment, the bolt 70 is used to fix the first and second lids 62, 63 to the spider body 61. Instead, a fixing pin may be used. In this case, after the fixing pin is inserted through the first insertion hole 62b and the second insertion hole 62c, the tip of the fixing pin is press-fitted into a fixing hole of the second lid 63. Instead of the bolt 70 or a fixing member (e.g., fixing pin), magnets, adhesives, tapes, or the like may be used to fix the first and second lids 62, 63 to the spider body 61.

In the present embodiment, the fixing pins 48 are used to fix the inner rings 44a, 45a of the first and second bearings 44, 45 on the inner surfaces of the first and second yokes 41, 42. Instead, bolts may be used. In this case, the first and second bearings 44, 45 are fixed to the inner surfaces of the first and second yokes 41, 42 by forming threaded holes in the inner surfaces of the first and second yokes 41, 42 and fastening the bolts to the threaded holes.

In the present embodiment, the pushing portion 46d may be omitted from the pushing member 46. In this case, the bottom wall 46a of the pushing member 46 is made flat for the bottom wall 46a to come into planar contact with the upper surface 28 of the second rotary shaft 24R2.

In the present embodiment, the first bearing 44 and the second bearing 45 do not have to be ball bearings. Instead, the first bearing 44 and the second bearing 45 may be any rolling bearings in which rolling elements other than balls are disposed between the inner ring and the outer ring.

In the present embodiment, the corners 46e of the pushing member 46 do not have to be rounded and may be chamfered to have an obtuse angle.

In the present embodiment, the musical instrument pedal device is applied to the twin pedal 20, including the two pedal devices 21L, 21R respectively operated by the left and right feet. Instead, the musical instrument pedal device may be applied to a drum system for playing a remote bass drum.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A universal joint, comprising:
   two yokes respectively connected to two rotary members;
   a spider rotationally coupled to the two yokes; and
   a bearing disposed at a portion that couples the two yokes to the spider, the bearing rotationally supporting the spider, wherein
   the spider is configured to be arranged in a space defined by inner surfaces of the two yokes and includes a dividing surface that divides the spider into multiple components,
   the multiple components include:
      a spider body including an accommodation portion in which the bearing is arranged; and
      a lid coupled to the spider body so as to cover the bearing in the accommodation portion, and
   the spider is configured to fix an outer ring of the bearing on the dividing surface by holding the outer ring of the bearing using the spider body and the lid.

2. The universal joint according to claim 1, wherein the spider is formed by coupling the multiple components to each other in a direction that is orthogonal to an axis of the bearing.

3. The universal joint according to claim 1, wherein
   the bearing is one of two bearings, and
   the spider is configured to fix the outer rings of the two bearings on the dividing surface.

4. The universal joint according to claim 1, wherein
   the bearing includes two bearings, and
   the two bearings share an axis and are fixed on the dividing surface at two positions on the axis.

5. The universal joint according to claim 4, wherein
   the two yokes include a first yoke and a second yoke,
   the bearing includes two first bearings disposed at a portion that couples the first yoke to the spider and two second bearings disposed at a portion that couples the second yoke to the spider, and
   the lid is configured to fix the two first bearings or the two second bearings to the spider.

6. The universal joint according to claim 1, wherein the spider body and the lid are coupled to each other in a state of being arranged on a straight line that is orthogonal to an axis of the bearing.

7. The universal joint according to claim 6, wherein the lid is coupled to the spider body at a position facing the spider body.

8. The universal joint according to claim 6, further comprising a fixing member that fixes the lid to the spider body, the fixing member having an axis, wherein
   the fixing member is arranged such that the axis of the fixing member coincides with the straight line orthogonal to the axis of the bearing.

9. The universal joint according to claim 1, wherein an inner ring of the bearing is fixed on the inner surfaces of the two yokes in an axial direction of the bearing.

10. A musical instrument pedal device comprising pedal devices, the musical instrument pedal device being used with rotary shafts of the pedal devices coupled to each other by a universal joint, wherein
    the universal joint includes:
    two yokes respectively connected to two rotary members;
    a spider rotationally coupled to the two yokes; and a bearing disposed at a portion that couples the two yokes to the spider, the bearing rotationally supporting the spider, and the spider is configured to be arranged in a space defined by inner surfaces of the two yokes and includes a dividing surface that divides the spider into multiple components, the multiple components include:
  a spider body including an accommodation portion in which the bearing is arranged; and
  a lid coupled to the spider body so as to cover the bearing in the accommodation portion, and the spider is configured to fix an outer ring of the bearing on the dividing surface by holding the outer ring of the bearing using the spider body and the lid.

* * * * *